US010728819B2

(12) United States Patent
Wong et al.

(10) Patent No.: US 10,728,819 B2
(45) Date of Patent: Jul. 28, 2020

(54) HANDLING HANDOVER REQUESTS IN A COMMUNICATIONS SYSTEM

(71) Applicant: NOKIA SOLUTIONS AND NETWORKS OY, Espoo (FI)

(72) Inventors: Curt Wong, Sammamish, WA (US); Peter Leis, Penzberg (DE); Jiadong Shen, Munich (DE); Juergen Mayer, Blaustein (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/370,376

(22) PCT Filed: Jan. 9, 2013

(86) PCT No.: PCT/EP2013/050274
§ 371 (c)(1),
(2) Date: Jul. 2, 2014

(87) PCT Pub. No.: WO2013/104651
PCT Pub. Date: Jul. 18, 2013

(65) Prior Publication Data
US 2015/0024751 A1    Jan. 22, 2015

Related U.S. Application Data

(60) Provisional application No. 61/584,968, filed on Jan. 10, 2012.

(51) Int. Cl.
*H04W 36/00* (2009.01)
*H04W 36/16* (2009.01)
(Continued)

(52) U.S. Cl.
CPC ....... *H04W 36/16* (2013.01); *H04W 36/0022* (2013.01); *H04W 76/16* (2018.02); *H04W 76/18* (2018.02)

(58) Field of Classification Search
CPC ......... H04W 36/0016; H04W 36/0022; H04W 76/027
(Continued)

(56) References Cited

U.S. PATENT DOCUMENTS 7,206,604 B2 *   4/2007   Berra et al. .................... 455/560
2006/0058031 A1   3/2006   Nemoto
(Continued)

FOREIGN PATENT DOCUMENTS

CN         1682468 A      10/2005
CN       102378282 A       3/2012
(Continued)

OTHER PUBLICATIONS

International Search Report and Written Opinion dated Apr. 8, 2013 corresponding to International Patent Application No. PCT/EP2013/050274.
(Continued)

Primary Examiner — Joseph E Dean, Jr.
(74) Attorney, Agent, or Firm — Squire Patton Boggs (US) LLP

(57) ABSTRACT

A scenario may arise in which a circuit switched (CS) bearer reservation is successful but a voice media switching from packet switched (PS) to CS performed by a mobile switching center (MSC) server fails. Certain embodiments provides systems, apparatuses, and methods for recovery from such a scenario. A method, for example, can include determining whether session transfer of a user equipment is possible in response to a request from a network element to initiate session transfer of the user equipment and reporting to the requesting network element either a generic or specific indication that the transfer is not possible, when it is determined that the session transfer is not possible.

19 Claims, 10 Drawing Sheets

(51) Int. Cl.
*H04W 76/18* (2018.01)
*H04W 76/16* (2018.01)

(58) Field of Classification Search
USPC .......................................................... 455/436
See application file for complete search history.

(56) References Cited

U.S. PATENT DOCUMENTS

| | | | |
|---|---|---|---|
| 2007/0209051 A1* | 9/2007 | Xu .......................... | H04H 20/26 725/63 |
| 2007/0217384 A1 | 9/2007 | Mitani | |
| 2009/0061878 A1* | 3/2009 | Fischer .................. | G08C 17/02 455/436 |
| 2009/0201810 A1* | 8/2009 | Kazmi et al. ................. | 370/232 |
| 2010/0124203 A1* | 5/2010 | Tenny .................... | H04W 36/24 370/331 |
| 2010/0238799 A1* | 9/2010 | Sebire ............... | H04M 15/8038 370/225 |
| 2010/0284374 A1* | 11/2010 | Evans .......................... | 370/332 |
| 2011/0122839 A1* | 5/2011 | Rexhepi ................ | H04W 36/12 370/331 |
| 2011/0151874 A1* | 6/2011 | Olsson .............. | H04W 72/1215 455/436 |
| 2013/0028187 A1 | 1/2013 | Aoyagi et al. | |
| 2015/0024751 A1 | 1/2015 | Wong et al. | |

FOREIGN PATENT DOCUMENTS

| | | |
|---|---|---|
| EP | 2007148 A2 | 12/2008 |
| EP | 2392186 A1 | 12/2011 |
| EP | 2803225 A1 | 11/2014 |
| GB | 2337184 A | 11/1999 |
| JP | 2007251654 A | 9/2007 |
| JP | 2009118519 A | 5/2009 |
| JP | 2011166437 A | 8/2011 |
| WO | 9934627 A1 | 7/1999 |
| WO | 2005/004353 A1 | 1/2005 |
| WO | 2013104651 A1 | 7/2013 |

OTHER PUBLICATIONS

3GPP TS 23.401 V11.0.0 (Dec. 2011), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Dec. 2011, 287 pages.
3GPP TS 23.216 V11.3.0 (Dec. 2011), Technical Specification, 3rd Generation Partnership Project; Technical Specification Group Services and System Aspects; Single Radio Voice Call Continuity (SRVCC); Stage 2 (Release 11), Dec. 2011, 59 pages.
3GPP TS 23.216 V11.2.0 (Sep. 2011), Technical Specification, 3rd Generation Partnership Project; Technical Specification Group Services and System Aspects; Single Radio Voice Call Continuity (SRVCC); Stage 2 (Release 11), Sep. 2011, 53 pages.
3GPP TS 23.237 V11.3.0 (Dec. 2011), Technical Specification, 3rd Generation Partnership Project; Technical Specification Group Services and System Aspects; IP Multimedia Subsystem (IMS) Service Continuity; Stage 2 (Release 11), Dec. 2011, 161 pages.
3GPP TSG SA WG2 Meeting #84, S2-111672, Ericsson et al., "Alining the error procedures for SRVCC with Stage 3," Apr. 6, 2011, XP050524585, 2 pages.
Vodafone, "SRVCC Failure Handling During Radio HO Preparation," 3GPP TSG-SA2 Meeting #68, S2-087170, Oct. 16, 2008, XP050331688, 2 pages.
Nokia Siemens Networks, "SRVCC Recovery Due to Incomplete IMS Session Continuity Procedure," SA WG2 Meeting #88E (Electronic), S2-120136, Jan. 11, 2012, XP050576027, 6 pages.
Japanese Office Action dated May 30, 2016, issued in corresponding Japanese Patent Application No. 2014-550722.
Japanese Office Action Notification of Reasons for Rejection application No. 2014-550722 dated Jul. 8, 2015.
Canadian Office Action dated Sep. 23, 2016 corresponding to Canadian Patent Application No. 2,860,741.
Notice to File a Response ("preliminary rejection") dated Nov. 9, 2016 corresponding to Korean Patent Application No. (PCT) 10-2016-7026066.
3GPP TS 29.010 V3.4.0 (Dec. 2000), Technical Specification, 3rd Generation Partnership Project; Technical Specification Group Core Network; Information element mapping between Mobile Station—Base Station System (MS-BSS) and Base Station System—Mobile—services Switching Centre (BSS-MSC); Signalling procedures and the Mobile Application Part (MAP) (Release 1999), Dec. 2000, 90 pages.
Japanese Office Action issued in corresponding Japanese Application No. 2014-550722 dated Dec. 26, 2016.
Chinese Office Action issued in corresponding Chinese Patent Application No. 201380005182.5 dated Jul. 4, 2017.
Canadian Office Action issued in corresponding Canadian Patent Application No. 2860741 dated Jul. 11, 2017.
European Office Action issued in corresponding European Patent Application No. 13 700 148.3 dated Nov. 6, 2017.
Chinese Office Action issued in corresponding Chinese Patent Appln. No. 201380005182.5 dated May 9, 2018.
Japanese Office Action and it's English language dated Jul. 9, 2018, issued in corresponding JP Application No. 2017-087407.
Canadian Office Action issued in corresponding Canadian Patent Application No. 2,860,741 dated Jun. 19, 2018.
European Office Action issued in corresponding European Patent Application No. 13 700 148.3 dated Jul. 2, 2018.
Chinese Office Action application No. 201380005182.5 dated Sep. 4, 2018.
European Office Action issued in corresponding European Patent Application No. 13 700 148.3-1214 dated Feb. 6, 2019.
ETSI: "LTE; General Packet Radio Service (GPRS) enhancements for Evolved Universal Terrestrial Radio Access Network (E-UTRAN) access (3GPP TS 23.401 Version 10.5.0 Release 10)", V10.5.0, Oct. 1, 2011, XP55161300.
Ericsson et al: "Alining the error procedures for SRVCC with stage 3", 3GPP Draft; S2-111672, Apr. 6, 2011.
Jun. 28, 2019 Office Action issued in Indian Patent Application No. 4157/DELNP/2014.
May 16, 2019 Office Action issued in Canadian Patent Application No. 2,860,741.

\* cited by examiner

HANDLING HANDOVER REQUESTS IN A COMMUNICATIONS SYSTEM

BACKGROUND

Field

During single radio voice call continuity procedures, a scenario may arise in which a circuit switched (CS) bearer reservation is successful but a voice media switching from packet switched (PS) to CS performed by a mobile switching center (MSC) server fails.

Description of the Related Art

FIG. 1 illustrates an overall single radio voice call continuity (SRVCC) procedure from an evolved universal terrestrial radio access network (E-UTRAN) to a global system for mobile communications (GSM) edge radio access network (GERAN) without dual transfer mode (DTM) support. Discussion of this procedure may be found in TS 23.216 v 11.2.0, which is incorporated herein by reference in its entirety.

As shown in FIG. 1, at S1, measurement reports can be sent from a user equipment (UE) to a source E-UTRAN. Then, at S2, the source E-UTRAN may make a decision for handover (HO). At S3, the E-UTRAN can send a message to a source mobility management entity (MME) indicating that handover is required. At S4, the source mobility management entity can perform bearer splitting. Then, at S5, the source mobility management entity can send a message to a mobile switching center (MSC) server/mobility gateway (MGW) indicating that packet switched (PS) to circuit switched (CS) is required. The mobile switching center Server/MGW can, at S6, send a message to a target mobile switching center indicating that preparation for handover is required. At S7, the target mobile switching center and target base station server (BSS) exchange a handover request and acknowledgement (ACK).

Then, at S8, the mobile switching center server/MGW can receive a response regarding handover preparation from the target mobile switching center. At S9, the mobile switching center server/MGW can establish a circuit with the target mobile switching center. Then, at S10, session transfer can be initiated by communication with an internet protocol (IP) multimedia subsystem (IMS). At S11, the IP multimedia subsystem can perform session transfer and update the remote end. Then, at S12, the IP multimedia subsystem can release the IP multimedia subsystem access leg.

Meanwhile, at S13, the mobile switching center server/MGW can send a packet switched to circuit switched response to the source mobility management entity, which—in turn—can send a handover command to the source E-UTRAN at S14. At S15, the source E-UTRAN can send a command to the user equipment to hand over from E-UTRAN. Then, at S16, the user equipment can tune to GERAN. This can be followed by, at S16, handover detection, suspension of the E-UTRAN side (S18, S18a, S18b), handover completion (S19), and various release, update, and reallocation steps (S20-S24).

Conventionally, the outcome of S10 has no influence on S13. As soon as the circuit switched radio bearer reservation is successful in S8, then MSS returns PS to CS Resp in S13. This triggers the radio handover procedure from long term evolution (LTE) to circuit switched in S16.

There are some reasons why the IP multimedia subsystem session transfer procedure may fail in S10 and/or S11. One reason is that the home subscriber server (HSS) failed to update the session transfer number for SR-VCC (STN-SR) in the mobility management entity, or for any other reason the session transfer number for single radio voice call continuity in the mobility management entity is incorrect. In R10 with eSRVCC, the session transfer number for single radio voice call continuity can point to an access transfer control function (ATCF) (in a serving public land mobile network (PLMN)) where the session is anchored. The HSS can update the mobility management entity with the session transfer number for single radio voice call continuity pointing to the access transfer control function. If the access transfer control function is changed, for example, if the user equipment is roaming to a new public land mobile network, then the HSS would conventionally need to update the current mobility management entity with a new session transfer number for single radio voice call continuity. The reasons why an HSS update to mobility management entity may fail can include a transient network issue, such as signaling link congestion, bad network configuration, or the like.

FIG. 2 illustrates session initiation protocol (SIP) level aspects of eSRVCC using an access transfer control function. As shown in FIG. 2, after a media path is set up, while there is interaction, at S1, between user equipment, radio access network (RAN), MME/SGSN, and mobile switching center as specified in 3GPP TS 23.216 (which is incorporated herein by reference in its entirety), a session initiation protocol INVITE (S2) can be sent to the access transfer control function. The access transfer control function can send (S3) a configuration message to an access transfer gateway (ATGW) and receive (S4) an acknowledgment of the message. Then, the access transfer control function can send (S5) a response to the session initiation protocol INVITE. Subsequently, a new media path can be set up. The access transfer control function can then send (S6) an access transfer update message to a service centralization and continuity application server (SCC-AS)/serving call session control function (S-CSCF) and receive (S7) a response including session state information (SSI). The access transfer control function can then send (S8) the SSI to the mobile switching center server.

If the session transfer number for single radio voice call continuity update fails, the single radio voice call continuity may or may not work anymore. If the session transfer number for single radio voice call continuity stored in the mobility management entity is the one pointing to a service centralization and continuity application server (SCC-AS) (in a home PLMN (H-PLMN)) then the single radio voice call continuity can continue to work as defined for R8/9 and without eSRVCC functionality. If the session transfer number for single radio voice call continuity pointing to the access transfer control function is from the previous/old visited network, then neither single radio voice call continuity nor eSRVCC can work. The reason for the inability of single radio voice call continuity or eSRVCC to work is because the INVITE from the MSS (S2) is, in such a scenario, sent toward an access transfer control function which has no subscription info for the user. The end result is that the user equipment is handed over to circuit switched side in the MSS, but the access transfer from IP multimedia subsystem to circuit switched domain, which is initiated by the INVITE (S2), is not successful. The MSS can conventionally only release the circuit switched call at this point, and user equipment may return back to LTE. This kind of unrealizable single radio voice call continuity can continue to occur for this user equipment, because the mobility management entity has no idea that its session transfer number for single radio voice call continuity is invalid.

There is no conventional way to handle this situation.

SUMMARY OF THE INVENTION

According to a first aspect of the invention there is provided a method of handling a handover request comprising:
receiving a request for the handover;
initiating the handover;
receiving a notification of transfer failure; and
sending a response to the request for the handover at least one of before the notification of transfer failure is received and after the notification of transfer failure is received indicating handover failure.

According to a second aspect of the invention there is provided a method provided of requesting a handover comprising:
sending a request for the handover to be initiated; and
receiving a response to the request for the handover indicating handover failure, the response having been sent at least one of before a notification of transfer failure is received and after the notification of transfer failure is received.

Preferably the request for the handover is sent by a mobility management entity. The mobility management entity may be an MME, for example in an LTE network. It may be an SGSN. It may be an entity comprising both MME functionality and SGSN functionality. The mobility management entity may initiate the handover. It may do this by sending a transfer request to a core network. The core network may be a core network subsystem. It may be a media delivering entity. The media delivering entity may be capable of delivery voice media such as calls and/or multimedia. It may be a call control platform such as the IP multimedia subsystem.

Preferably, the request for the handover is received by a switching entity. The switching entity may be a mobile switching centre, for example a mobile switching centre server such as an MSS. It may be a mobility gateway. It may be an entity comprising both switching functionality and gateway functionality.

Preferably, the notification of transfer failure is sent by the core network. It may be received to the switching entity.

Preferably, the response is sent by the switching entity. It may be sent to the mobility management entity.

Preferably, the transfer failure is failure to hand over a session. The session may be a media session. It may be a voice media session. It may be a multimedia session. It may be handover from one radio access technology type to another radio access technology type. It may be handing over a session taking place according to one radio resource type to another radio resource type. For example, it may involve handing over a session being a packet switched session to a session being a circuit switched session.

The request may be for a radio resource reservation. It may be for a circuit-switched radio resource reservation. It may be for SRVCC.

The session may be between a first user equipment and a second user equipment.

The handover may be triggered by measurement reports indicating that one of the user entities should be served by a target radio access network (RAN) rather than by a source RAN. The need for a handover may be determined in the source RAN. The source RAN may indicate the need for a handover to the mobility management entity. This may be considered to be a source mobility management entity. The source mobility management entity may indicate the need for a handover to a source switching entity. This may be an MSC server and/or a media gateway. The source switching entity may send a handover request to the switching entity. This may be considered to be a target switching entity. Receiving this handover request may be followed by initiating a bearer level handover with a radio access network, for example between the target switching entity and a target RAN. Initiating the handover may follow the establishment of the bearer level handover with the target RAN. In some embodiments of the invention, handing over from a source RAN to a target RAN also means handing over from a source RAT to a target RAT.

In this way it can be considered that according to the invention a handover may have two aspects. A first aspect in which a handover is to occur at a radio resource level and a second aspect in which a session is to be transferred.

In a case in which sending the response to the request for the handover takes place after the notification of transfer failure is received, the response to the request for the handover is a negative response indicating that a transfer is not able to take place. The negative response may be sent by the switching entity. It may be sent to the mobility management entity. The negative response may comprise a reject cause. The reject cause may be Session Transfer leg establishment error.

The negative response may be followed by a transfer failure message being sent. It may be sent by the mobility management entity. It may be sent to a network element in an access network. It may be sent to a network element which started a procedure for the handover to take place.

Following sending of the reject cause, there may be an operation to clear the target RAT. This may involve the target RAN being notified to release the reserved resource as it is no longer needed.

There may be a notification that no session handover will be available for the session. The notification may be provided by the mobility management entity. It may be provided to a RAN. It may be provided to the source RAN.

In a case in which sending the response to the request for the handover takes place before the notification of transfer failure is received, the response to the request for the handover is a positive response indicating that handover is able to take place. The positive response may be followed by handover command message being sent. It may be sent by the mobility management entity. It may be sent to user equipment such as a mobile terminal being served by a network element in an access network. The network element may have started a procedure for the handover to take place. The handover command message may cause the user equipment to switch to using another RAT technology. This may be a circuited-switched RAT.

The positive message may indicate a successful radio resource reservation. For example that a target radio resource has been successfully reserved.

Following receipt of the notification of transfer failure, an additional response to the request for the handover may be sent. This may be a negative response indicating that a transfer is not able to take place. It may be considered that the negative response is actually an update message updating the response message.

Following receipt of the reject cause, a call release instruction may be provided. It may be provided by the switching entity. It may instruct a RAN to release a reserved radio connection and/or radio resources, for example that and/or those connecting the RAN and a user equipment at the radio level. The instruction may be provided by the switching entity. It may be provided to the RAN. This may be done after a transfer complete message is sent.

In the case in which sending the response to the request for the handover takes place before the notification of transfer failure is received, it will therefore be understood that there is both a positive response and a negative response sent. The negative response may correctly identify a situation which was incorrectly indicated by the positive response. The negative response may be a handover complete message including an error cause.

The negative response may be sent by the switching entity. It may be sent to the mobility management entity. The negative response may comprise a reject cause. The reject cause may be Session Transfer leg establishment error.

The notification of transfer failure may be received during a Session Transfer procedure. The failure may be due to an invalid STN-SR, a temporary failure, or another problem. An invalid STN-SR may be an example of a permanent error. It may be indicated by a 404 user not found indication.

Although in any one instance, the response to the request for the handover is sent either before the notification of transfer failure is received or after the notification of transfer failure is received, for any particular instance, following the sending of a message initiating the handover and it is a possibility that sending the response to the request for the handover may take place both before and after the notification of transfer failure is received. The possibility then becomes a reality when, according to the sequence which actually occurs, either the response to the request for the handover or the notification of transfer failure is sent first.

A negative response may be followed by one or steps taken to prevent further handover attempts. This may be to prevent further handover attempts for a particular session. This may be to prevent further handover attempts for a particular user equipment. This may comprise a parameter or value being deleted at the mobility management entity. In one embodiment this is a session transfer number. This may have been stored at the mobility management entity for single radio voice call continuity. It may be possible to prevent further handover attempts for other sessions. This may apply until remedial action is taken to resolve the issue causing the failure, for example for a session transfer number to be updated by another entity such as a subscriber database. It may comprise setting a session transfer operation possible value to "NO". Such a setting may be in the mobility management entity. Alternatively or additionally it may be in a RAN entity.

In one embodiment, the transfer failure message comprises an information element which indicates that a particular handover type for a session is not possible. This information element can be set by the mobility management entity. It can be provided to a RAN entity to ensure that handover of the session will not trigger again. Another possibility is that the mobility management entity can send a context modification request message to the RAN entity immediately after sending the transfer failure message to update the particular handover type is not possible.

According to a third aspect of the invention there is provided a handover handling network entity comprising:
a receiver to receive a request for the handover;
a processor to initiate the handover;
the receiver to receive a notification of transfer failure; and
a transmitter to send a response to the request for the handover at least one of before the notification of transfer failure is received and after the notification of transfer failure is received indicating handover failure.

According to a fourth aspect of the invention there is provided a handover requesting network entity comprising:
a transmitter to send a request for the handover to be initiated; and
a receiver to receive a response to the request for the handover indicating handover failure, the response having been sent at least one of before a notification of transfer failure is received and after the notification of transfer failure is received.

According to a fifth aspect of the invention there is provided a system comprising a handover requesting network entity and a handover handling network entity, wherein the handover requesting network entity comprises:
a transmitter to send a request for the handover to be initiated; and
a receiver to receive a response to the request for the handover indicating handover failure, the response having been sent at least one of before a notification of transfer failure is received and after the notification of transfer failure is received,
and the handover handling network entity comprises:
a receiver to receive a request for the handover;
a processor to initiate the handover;
the receiver to receive a notification of transfer failure; and
a transmitter to send a response to the request for the handover at least one of before the notification of transfer failure is received and after the notification of transfer failure is received indicating handover failure.

According to a sixth aspect of the invention there is provided a method of handling a handover request comprising:
receiving a request for the handover;
initiating the handover;
receiving a notification of transfer failure; and
sending a response to the request for the handover at least one of before the notification of transfer failure is received and after the notification of transfer failure is received indicating handover failure.

According to a seventh aspect of the invention there is provided a computer program product configured to control a processor to perform instructions to handle a handover request comprising:
receiving a request for the handover;
initiating the handover;
receiving a notification of transfer failure;
sending a response to the request for the handover at least one of before the notification of transfer failure is received and after the notification of transfer failure is received indicating handover failure.

According to a eighth aspect of the invention there is provided a computer program product configured to control a processor to perform instructions to request a handover comprising:
sending a request for the handover to be initiated; and
receiving a response to the request for the handover indicating handover failure, the response having been sent at least one of before a notification of transfer failure is received and after the notification of transfer failure is received.

Preferably, the computer program product is embodied on a non-transitory computer readable medium.

BRIEF DESCRIPTION OF THE DRAWINGS

For proper understanding of the invention, reference should be made to the accompanying drawings, wherein.

DETAILED DESCRIPTION

Third Generation Partnership Project (3GPP) Release 8 supports single radio voice call continuity (SRVCC) in the direction from an evolved universal terrestrial radio access network (E-UTRAN)/high speed packet access (HSPA) to a universal terrestrial radio access network (UTRAN)/global system for mobile communication (GSM) edge radio access network (GERAN). Supporting single radio voice call continuity may require circuit switched (CS) bearer reservation with the target radio access technology (RAT) and voice media switching from packet switched (PS) to circuit switched performed by an internet protocol (IP) multimedia subsystem (IMS). This functionality is described in 3GPP TS 23.216, which is incorporated herein in its entirety.

Enhanced SRVCC (eSRVCC) in 3GPP Release 10 may allow for optimized delay during access transfer from E-UTRAN/HSPA to UTRAN/GERAN. A functional entity, referred to as an access transfer control function (ATCF), has been created for eSRVCC. Functionality for the access transfer control function is specified in 3GPP TS 23.237, which is incorporated herein in its entirety.

A scenario may arise in which a circuit switched bearer reservation is successful but a voice media switching from packet switched to circuit switched, performed by a mobile switching center server fails. Certain embodiments provide systems, apparatuses, and methods for recovery from such a scenario. Voice media switching from packet switched to circuit switched performed by a mobile switching center server can refer to sending out a session transfer request, for example, sending out a session initiation protocol (SIP) INVITE message. The methods of recovery may involve additional information exchange among a mobile switching center server (MSS)/mobility management entity (MME)/ and evolved Node B (eNb) system, as will be discussed below. Thus, certain embodiments provide a way for a mobility management entity to detect (for example, O&M) and prevent single radio voice call continuity from re-occurring in this situation.

Figure 1:
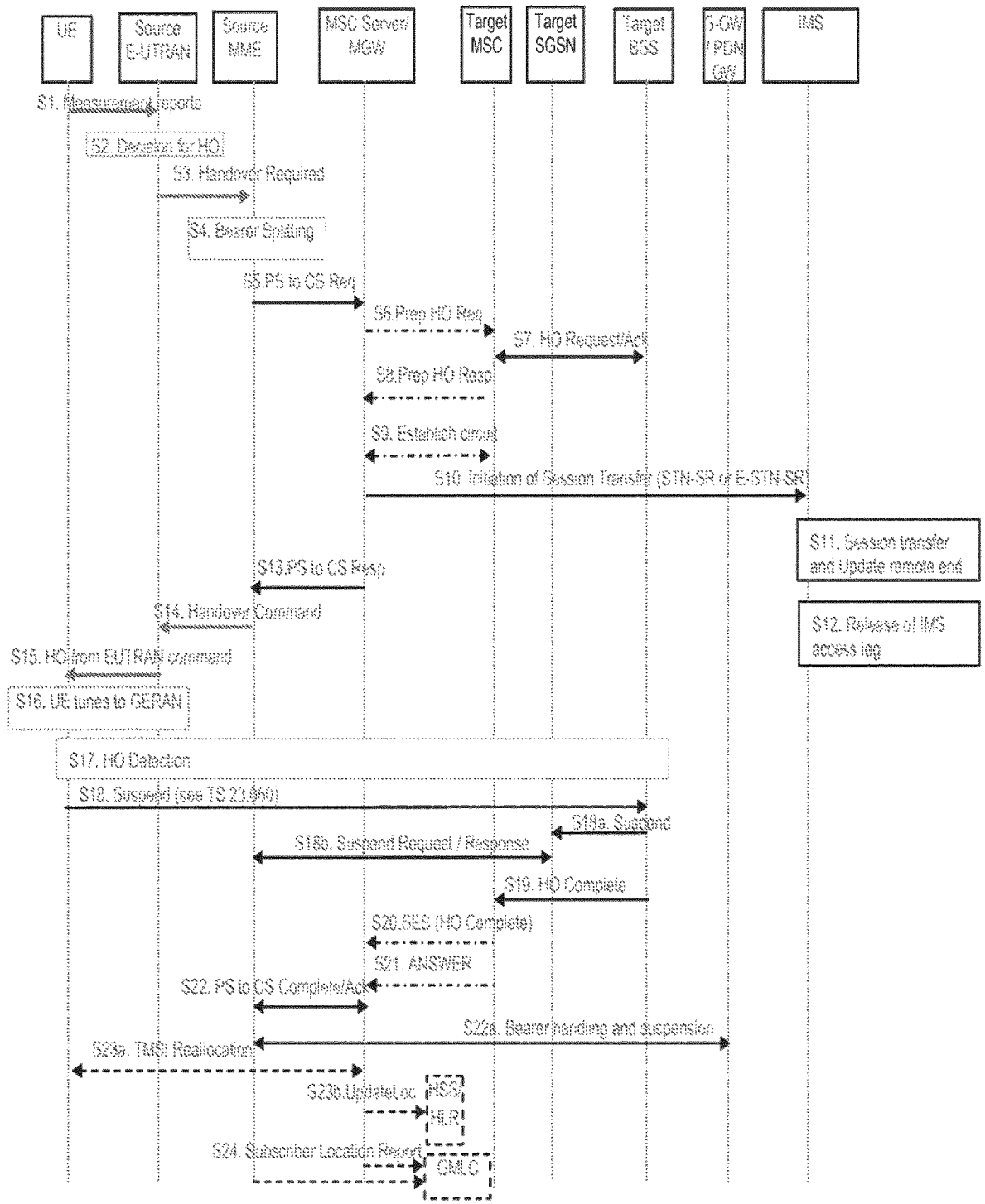
FIG. 1 illustrates an overall single radio voice call continuity procedure from E-UTRAN to GERAN without DTM support.
Figure 3:
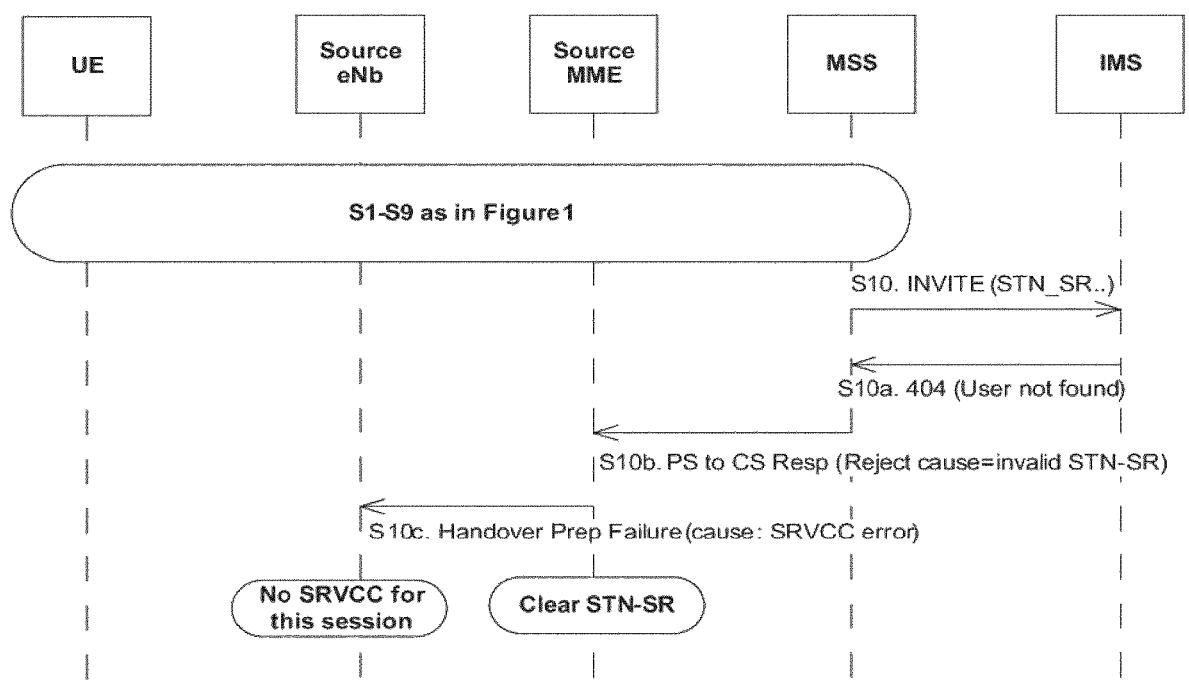
FIG. 3 illustrates an embodiment of a method of single radio voice call continuity recovery.

FIG. 3 illustrates a first alternative embodiment of a method of single radio voice call continuity recovery. In this alternative, the system and protocol can ensure that the MSS does not return a positive PS to CS Resp in S13 of FIG. 1 unless the MSS gets a positive indication from the IP multimedia subsystem as a response to S10 of FIG. 1 (for example, 1xx or 2xx response). If the MSS sends an INVITE (S10 of FIG. 1) to an access transfer control function that does not serve the user equipment, then this access transfer control function can (at S10a of FIG. 3) return a negative indication in a response to the MSS. The negative indication can be, for example, 404 User not found or some other error indication.

Figure 2:
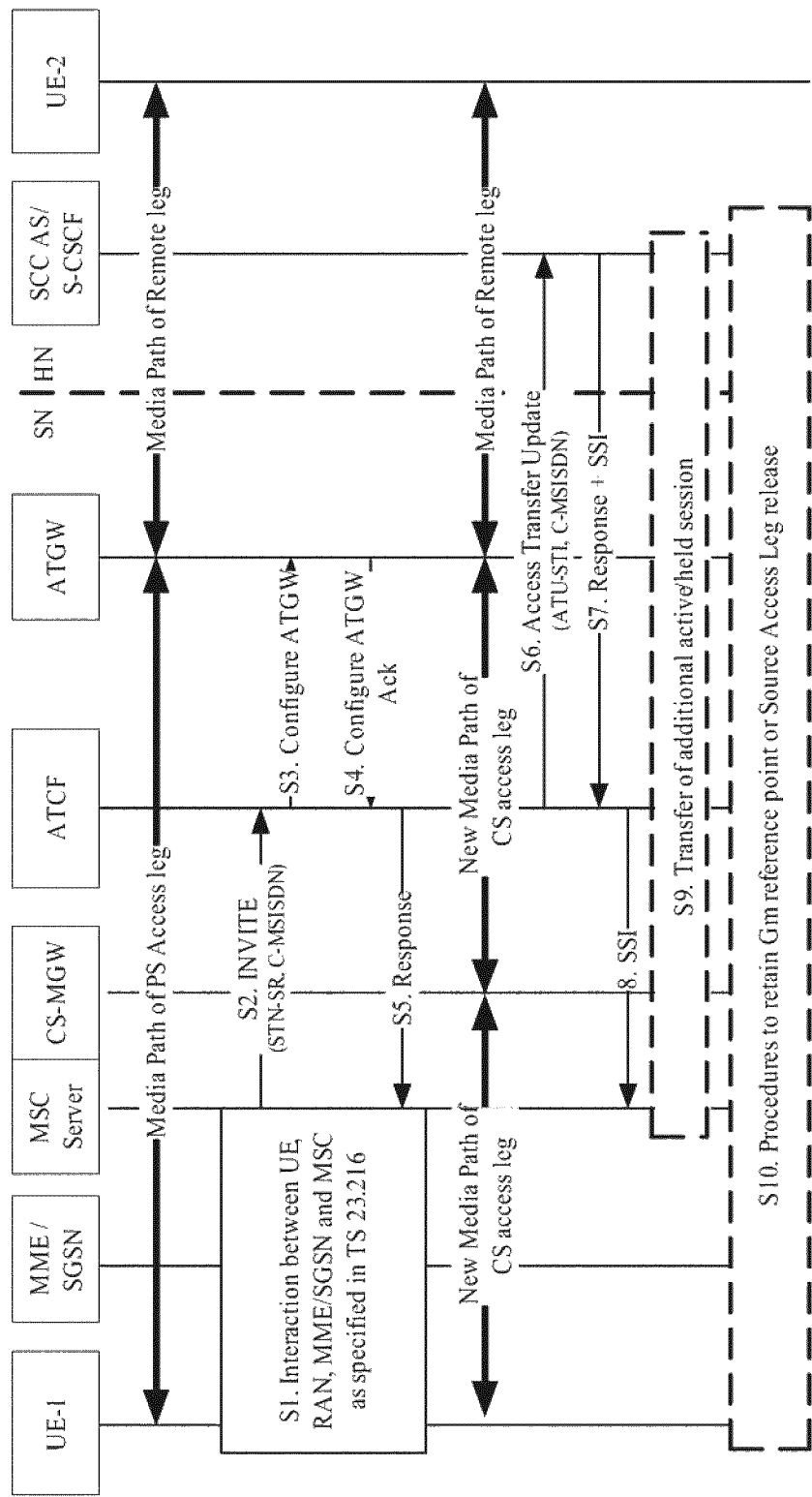
FIG. 2 illustrates session initiation protocol level aspects of eSRVCC using an access transfer control function.

In addition to the case in which the user is unknown, there may be other reasons why an ATCF/SCC-AS in an IMS may reject the INVITE. For example, the user may be known, but there may be no transferrable session for the user. A different response code can be used for this case, to enable the MSS to distinguish between, for example, a case where the user is unknown and the case where the user is known but there is no transferrable session associated with the user. This latter scenario may occur due to a race condition. For example, while the SRVCC US/MME starts the SRVCC procedure, a remote UE (see, for example, UE-2 in FIG. 2) may release the session at the same time. This situation may be indicated by a code such as, for example, a 480 code.

If the MSS gets a negative response from the access transfer control function, it can (at S10b in FIG. 3) include a "SRVCC reject Cause" in "SRVCC PS to CS Response" to the mobility management entity. The reject cause can indicate to the mobility management entity that this failure is caused by "invalid STN-SR" as opposed to be caused by some other reason, such as inability to reach the access transfer control function or the case where the user is known but there is no transferrable session.

When the mobility management entity gets this reject cause, the mobility management entity can cancel the packet switched to circuit switched HO procedure with the eNb and can indicate (at S10c in FIG. 3) to the eNB that single radio voice call continuity should not be performed for this session. The mobility management entity can also delete the stored session transfer number for single radio voice call continuity. Thus, the mobility management entity can prevent future single radio voice call continuity invocation for new evolved packet system (EPS) session until the session transfer number for single radio voice call continuity is updated by the HSS. The mobility management entity can also generate an internal alarm log to indicate the cause of the single radio voice call continuity failure for easy troubleshooting. The mobility management entity may further try to refresh its stored session transfer number for single radio voice call continuity by querying the HSS.

Every single radio voice call continuity handover may have some delay while the MSS waits for the IP multimedia subsystem response (S10a in FIG. 3) to determine whether it is, for example, 1xx or 404/negative response before it can resume the circuit switched bearer HO response to the mobility management entity (S10b in FIG. 3). If the error situation occurs only infrequently, this may lead to a significant tradeoff between error detection and delay. However, this tradeoff can be reduced.

Figure 4:
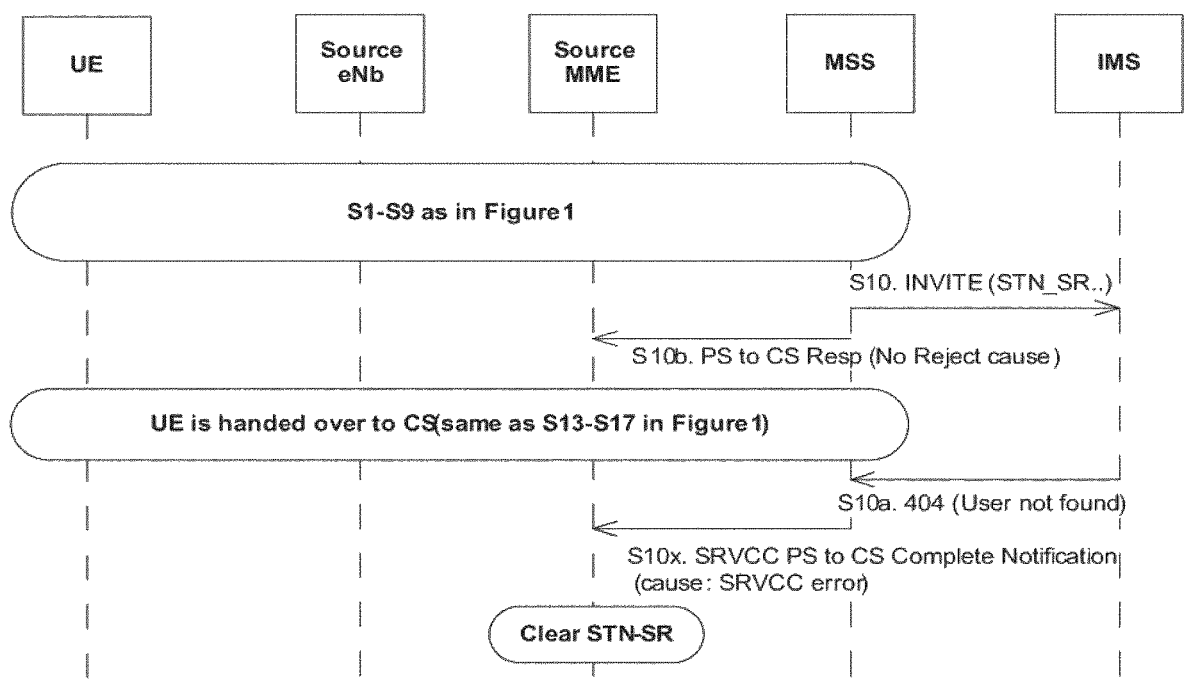
FIG. 4 illustrates another embodiment of a method of single radio voice call continuity recovery.

FIG. 4 illustrates another alternative embodiment of a method of single radio voice call continuity recovery. This embodiment can avoid the serialization, that is the steps being carried out one after another, that may exist in the embodiment illustrated in FIG. 3.

As shown in FIG. 4, the mobility management entity can send an affirmative response (S10b corresponding to S10b in FIG. 3) even when the IP multimedia subsystem response (S10a of FIG. 3) has not yet arrived. This can cause the user equipment to hand over to the circuit switched side without waiting for the IP multimedia subsystem response. Otherwise, the behavior can be as described in reference to FIG. 3.

When the MSS gets (at S10a in FIG. 4) the 404/negative response from the IP multimedia subsystem after the MSS has responded to the mobility management entity with SRVCC PS to CS Response, then the MSS can include (at S10x in FIG. 4) an error cause of "invalid STN-SR" in an SRVCC PS to CS Complete Notification. Although the user equipment will be handed over to the circuit switched side due to the late arrival of S10a (comparatively late in FIG. 4 as compared to FIG. 3), the indication in the SRVCC PS to CS Complete Notification can allow the mobility management entity to avoid further single radio voice call continuity invocation when the user equipment goes back to LTE.

Accordingly, certain embodiments can provide the mobility management entity with a clear indication as to why single radio voice call continuity has failed. Consequently, operation of the system can be more predictable and repeated failures for the same reason can be avoided or expedited. Likewise, fallback procedures can be more expediently pursued, if appropriate. One example of a fallback procedure is circuit switched fallback (CSFB) for voice.

The above embodiments presented "bad STN-SR" as a use case to illustrate the cause of IP multimedia subsystem session transfer failure. The IP multimedia subsystem session transfer can fail for other reasons as well. Thus, other embodiments can provide additional indications regarding the cause of failure, or can provide a more generic indication of failure. For example, the cause value indicated by the MSS to mobility management entity in (S10b and S10x in FIGS. 3 and 4) can be made in a generic manner, such as "Session Transfer leg establishment error".

The interaction between the mobility management entity and the source eNb that is shown in FIG. 3 can also have various methods. One variation is that the Handover Failure includes SRVCC Operation Possible information element (IE), which indicates that single radio voice call continuity is "not possible". This IE can be set by the mobility management entity. The eNb can use this new indication to ensure single radio voice call continuity for this call will not trigger again. Another possibility is that the mobility management entity can send a UE context modification request message to the eNb immediately after sending the handover failure message to update the single radio voice call continuity operation possible information element to "not possible".

Figure 5:
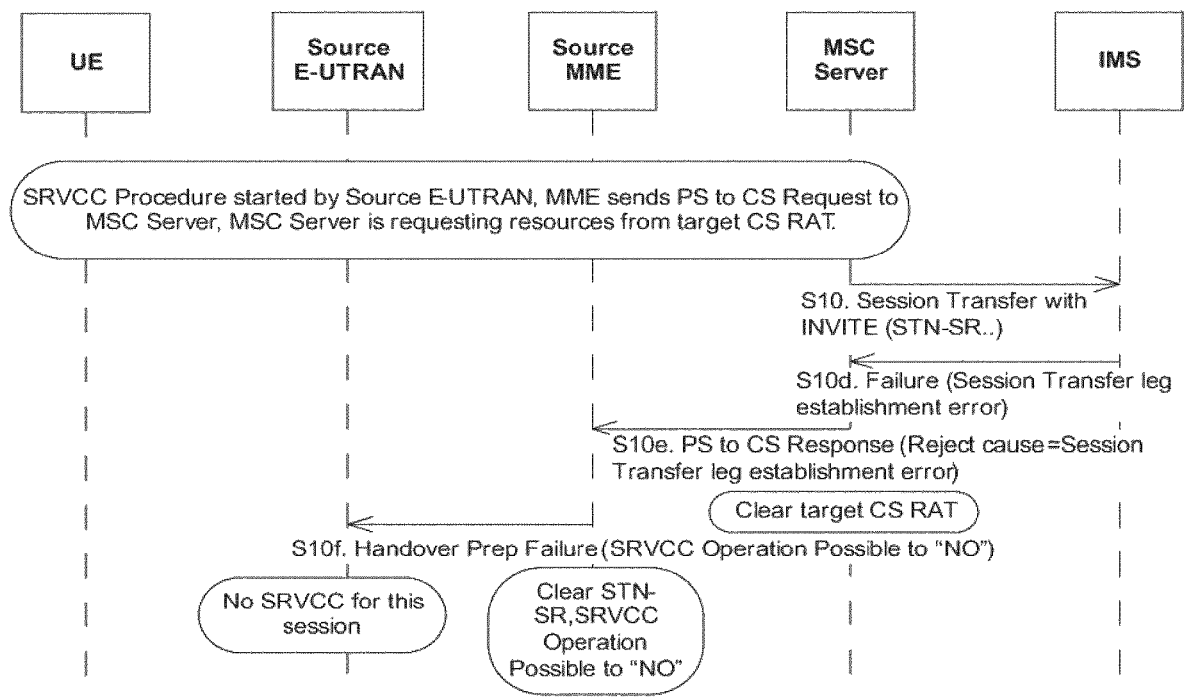
FIG. 5 illustrates an embodiment of recovery from session transfer leg establishment error before responding to request for handover from packet switched to circuit switched.
Figure 6:
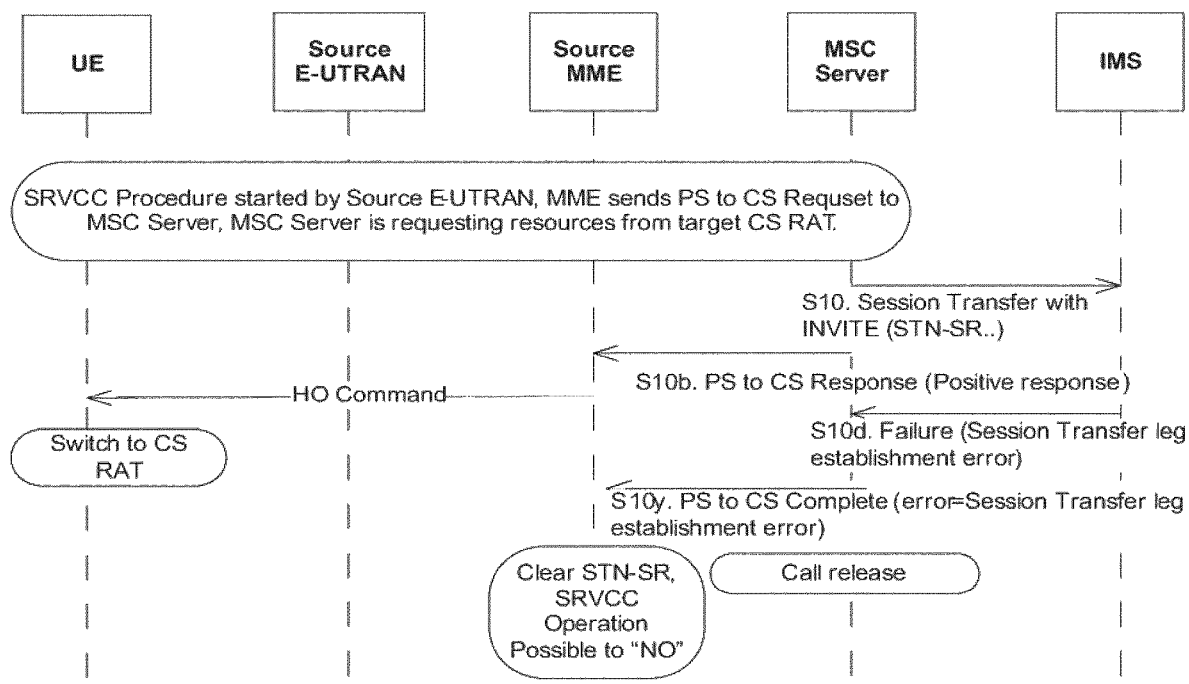
FIG. 6 illustrates an embodiment of recovery from session transfer leg establishment error after responding to request for handover from packet switched to circuit switched.

FIGS. 5 and 6 show how the mobile switching center can use a generic error code "Session Transfer leg establishment error" and how the mobility management entity can include the SRVCC Operation possible IE set to "NO" in a handover failure message.

In particular, FIG. 5 illustrates an embodiment of recovery from session transfer leg establishment error before responding to request for handover from packet switched to circuit switched. As shown in FIG. 5, a SRVCC procedure can be started by a source E-UTRAN and an MME can send a PS to CS Request to a MSC Server. The MSC Server can request resources from a target CS radio access technology (RAT). S10 can be performed to provide a session transfer message with INVITE as in FIG. 3. Then, at S10d (similar to S10a in FIG. 3) failure can be reported, in this case with a generic failure message. At S10e (similar to S10b in FIG. 3) this failure can be reported on to the source MME. Then the MSC server can clear the target CS radio access technology. At S10f (similar to S10c in FIG. 3), the source MME can signal handover preparation failure with a generic failure message to the source E-UTRAN. The source E-UTRAN can then determine that there is to be no single radio voice call continuity procedure for this session. Meanwhile, the source MME can clear a stored STN-SR, and set SRVCC Operation Possible to "NO". One or both of these settings can apply in respect of the current session. In one embodiment of the invention, the cleared STN-SR and/or the "NO" setting can also apply to subsequent new sessions of the particular user equipment. This can be done by storing the new values in the local user subscription profile in MME.

FIG. 6 illustrates an embodiment of recovery from session transfer leg establishment error after responding to request for handover from packet switched to circuit switched. As shown in FIG. 6, single radio voice call continuity procedures can begin as shown in FIG. 5, and S10 can be the same as in FIG. 5. However, without waiting for the IMS to reply, the MSC server can, at S10b, provide a positive response to the source MME, which can then provide a handover command to the UE, causing the UE to switch to a circuit switched radio access technology.

Meanwhile, at S10d, the IMS can report a failure in generic terms to the MSC server. The MSC server can then, at S10y, provide a PS to CS Complete message indicating the generic error to the source MME. The MSC server can then release the call. Meanwhile, the source MME can clear a stored STN-SR, and set SRVCC Operation Possible to "NO." As indicated in the foregoing, one or both of these settings can apply in respect of the current session or in respect of subsequent new sessions of the particular user equipment.

It will be understood that although FIGS. 2 to 6 are presented as methods, these Figures show interconnections between network entities and a user equipment and accordingly they can be considered to be representations of systems comprising the entities user equipment, a RAN entity, a mobility management entity, a switching entity, and a core network entity (IMS).

Figure 7:
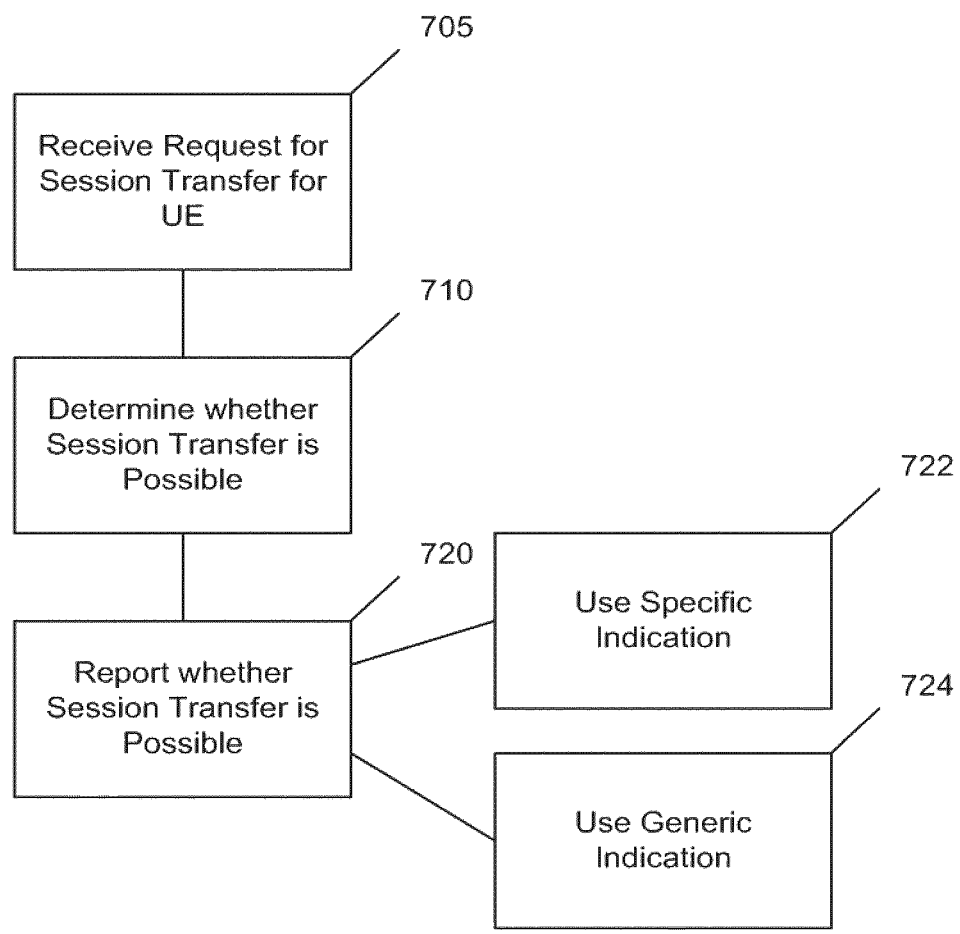
FIG. 7 illustrates a method according to certain embodiments.

FIG. 7 illustrates a method according to certain embodiments. As shown in FIG. 7, at 710, a device or a subsystem (such as an IMS) can determine whether session transfer of a user equipment is possible in response to a request (received at 705) from a network element (such as an MSC server) to initiate session transfer of the user equipment. The method can also include, at 720, reporting to the requesting network element either using a generic indication (724) or a specific indication (722) that the transfer is not possible, when it is determined that the session transfer is not possible.

It was be understood that in relation to the embodiments of the method described in the foregoing, if handing over of the session fails, the session continues to take place in the source RAT assuming that it can be supported. Specifically, this may means that an MSS may release any CS radio resource it has reserved/set up, and the user equipment may continue to use or return back to a PS RAT.

Figure 8:
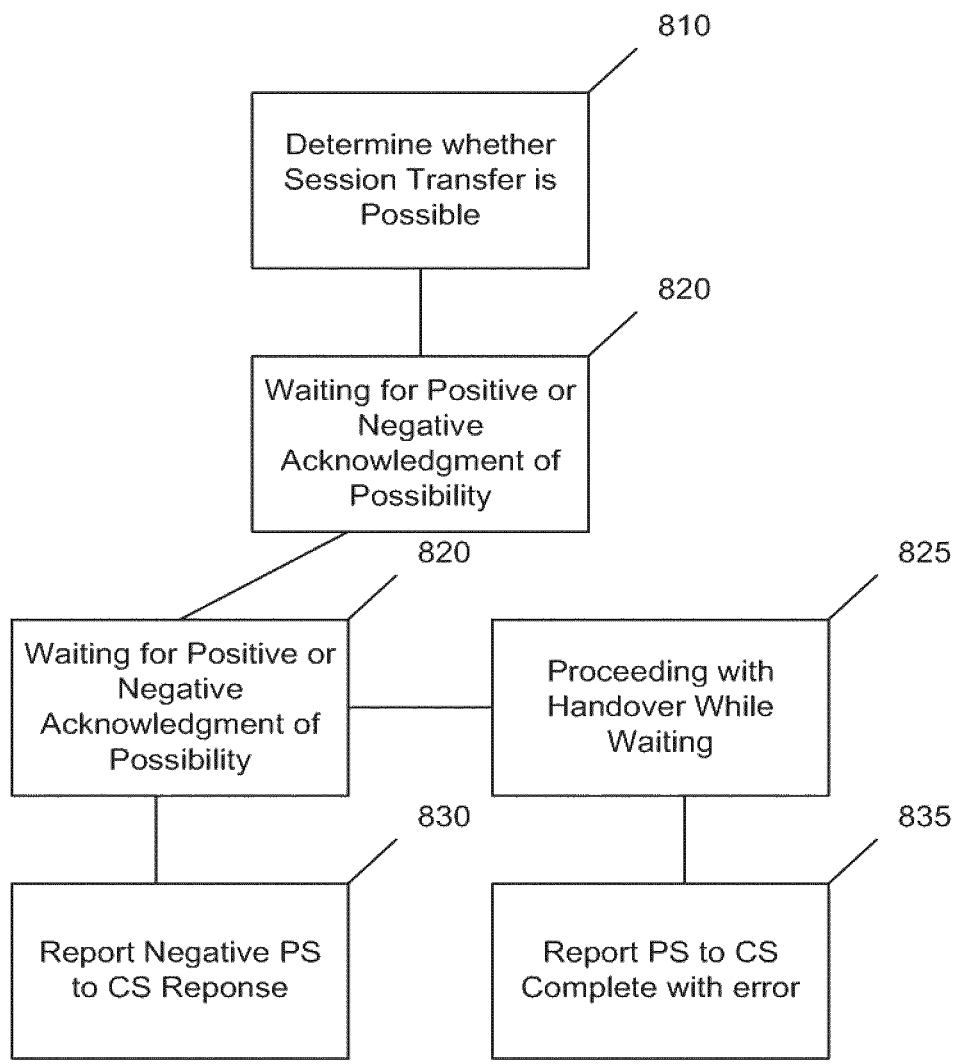
FIG. 8 illustrates another method according to certain embodiments.

FIG. 8 illustrates another method according to certain embodiments. As shown in FIG. 8, a method (which can be performed by, for example, an MSS) can include, at 810, requesting session transfer of a user equipment from an internet protocol multimedia subsystem. The method can also include, at 820, waiting for a positive or negative acknowledgment that session transfer is possible from the internet protocol multimedia subsystem. The method can also include, at 825, reporting to a source mobility management entity a positive response while waiting for an actual response from the internet protocol multimedia subsystem. The method can further include reporting (at 830 or 835) to a mobility management entity either a generic or specific indication that the transfer is not possible when a negative acknowledgement is received. Specifically, if the handover did not proceed, the report can include, at 830, reporting a negative PS to CS response. Alternatively, if the handover was already proceeding, the reporting can include, at 835, reporting a PS to CS complete.

Figure 9:
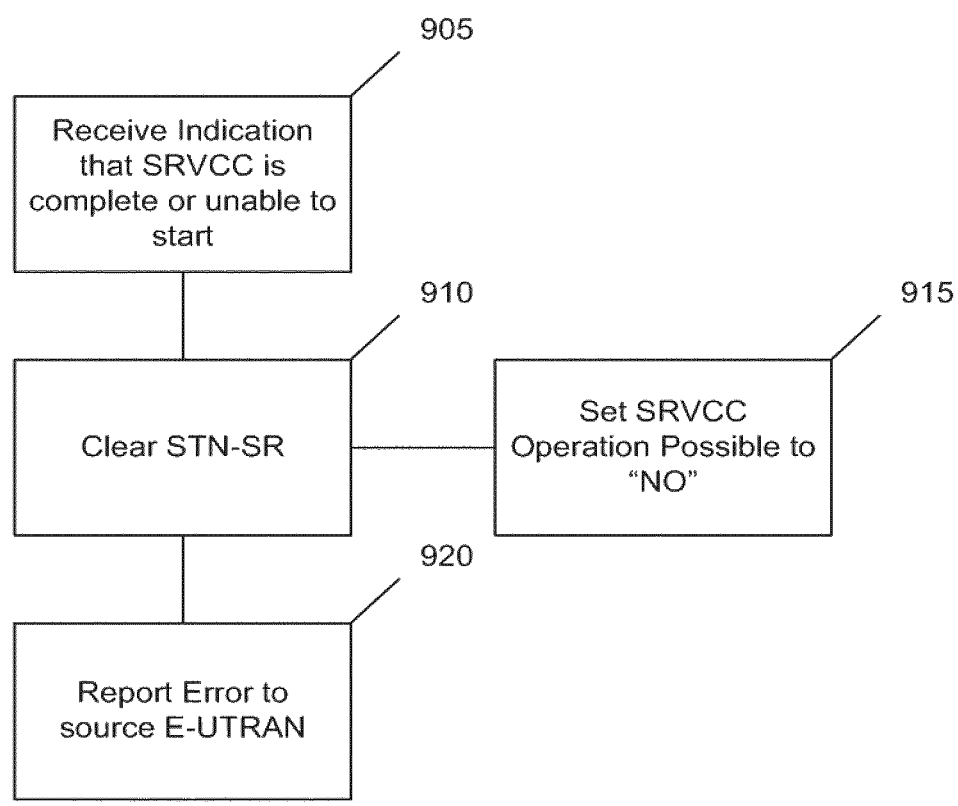
FIG. 9 illustrates a further method according to certain embodiments.

FIG. 9 illustrates a further method according to certain embodiments. As shown in FIG. 9, a method (which can be performed by, for example, an MME) can include, at 905, receiving an indication that single radio voice call continuity is complete or unable to begin due to an error. The method can also include, at 910, clearing a stored session transfer number for single radio voice call continuity. The method can further include, at 920, reporting handover preparation failure with an indication of the error to a source E-UTRAN. The error can be identified generically or specifically both in 905 and in 920. The method can also include, at 915, setting SRVCC Operation Possible to "NO".

Figure 10:
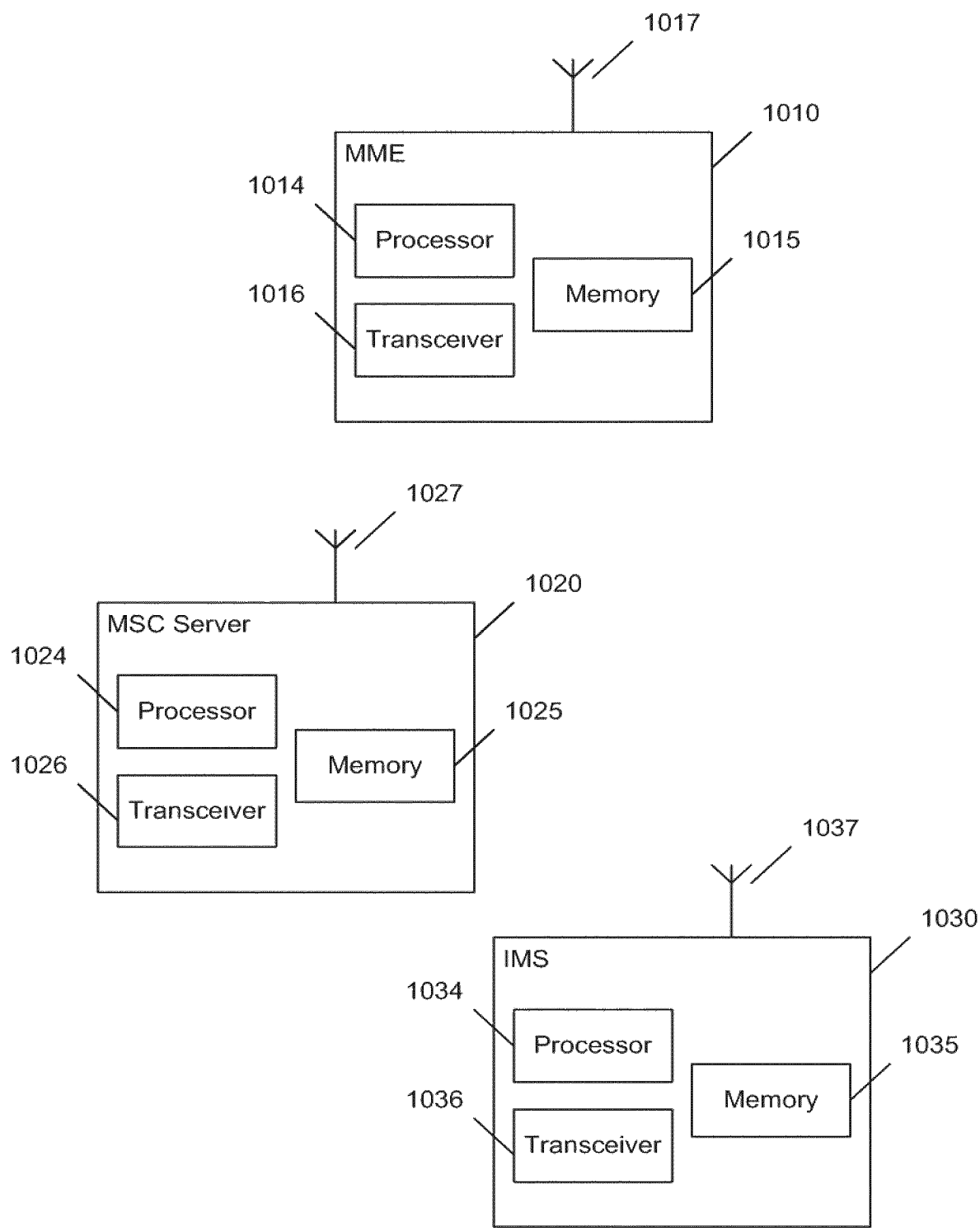
FIG. 10 illustrates a system according to certain embodiments.

FIG. 10 illustrates a system according to certain embodiments. In an example embodiment, a system may include three devices or subsystems, MME 1010, MSC server 1020, and IMS 1030. Each of the devices 1010, 1020, and 1030 may be equipped with at least one processor (respectively 1014, 1024, and 1034), at least one memory (respectively 1015, 1025, and 1035) including computer program instructions or code, a transceiver (respectively 1016, 1026, and 1036), and an antenna (respectively 1017, 1027, and 1037).

Each transceiver 1016, 1026, and/or 1036 can be a transmitter, a receiver, both a transmitter and a receiver, or a unit that is configured both for transmission and reception. The transceiver 1016, 1026, and/or 1036 can be coupled to one or more respective antenna(s) 1017, 1027, and/or 1037, which may include a directional antenna, or a microwave link. There is no requirement that the MME 1010, MSC server 1020, and IMS 1030 be equipped with an antenna. Instead, for example, the MME 1010, MSC server 1020, and IMS 1030 can all be configured for only wired communication over a network, such as a fiber-optic network.

Each at least one processor 1014, 1024, and/or 1034 can be variously embodied by any computational or data processing device, such as a central processing unit (CPU) or application specific integrated circuit (ASIC). The at least one processor 1014, 1024, and/or 1034 can be implemented as one or a plurality of controllers.

Each at least one memory 1015, 1025, and/or 1035 can be any suitable storage device, such as a non-transitory computer-readable medium. For example, a hard disk drive (HDD) or random access memory (RAM) can be used in the at least one memory 1015, 1025, and/or 1035. The at least one memory 1015, 1025, and/or 1035 can be on a same chip as the corresponding at least one processor 1014, 1024, and/or 1034, or may be separate from the corresponding at least one processor 1014, 1024, and/or 1034.

The computer program instructions may be any suitable form of computer program code. For example, the computer program instructions may be a compiled or interpreted computer program.

Each at least one memory 1015, 1025, and/or 1035 and computer program instructions can be configured to, with the corresponding at least one processor 1014, 1024, and/or 1034, cause a hardware apparatus (for example, directional radio enabled device 1010, or legacy devices 1020 and/or 1030) to perform a process, such as the processes described above.

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of MME 1010, MSC server 1020, and IMS 1030 can include a user interface that is operable connected to the corresponding processor 1014, 1024, and/or 1034 and corresponding memory 1015, 1025, and/or 1035. That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. However, there is no requirement that any such additional components be provided. For example, each of MME 1010, MSC server 1020, and IMS 1030 can be implemented as a rack-mounted computer. Although the MME 1010, MSC server 1020, and IMS 1030 are shown as separate boxes, the devices may, in certain cases, be located within a same physical enclosure.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

According to certain embodiments, a method (IMS) can include determining whether session transfer of a user equipment is possible in response to a request from a network element to initiate session transfer of the user equipment. The method also includes reporting to the requesting network element either a generic or specific indication that the transfer is not possible, when it is determined that the session transfer is not possible.

In certain embodiments, an apparatus includes at least one processor and at least one memory including computer program code. The at least one memory and computer program code are configured to, with the at least one processor, cause the device at least to determine whether session transfer of a user equipment is possible in response to a request from a network element to initiate session transfer of the user equipment. The at least one memory and computer program code are also configured to, with the at least one processor, cause the device at least to report to the requesting network element either a generic or specific indication that the transfer is not possible, when it is determined that the session transfer is not possible.

An apparatus, according to certain embodiments, includes determining means for determining whether session transfer of a user equipment is possible in response to a request from a network element to initiate session transfer of the user equipment. The apparatus also includes reporting means for reporting to the requesting network element either a generic or specific indication that the transfer is not possible, when it is determined that the session transfer is not possible.

A computer readable medium (such as a non-transitory medium) can, in certain embodiments, be encoded with instructions that, when executed in hardware, perform a process. The process includes determining whether session transfer of a user equipment is possible in response to a request from a network element to initiate session transfer of the user equipment. The process also includes reporting to the requesting network element either a generic or specific indication that the transfer is not possible, when it is determined that the session transfer is not possible.

According to certain embodiments, a method can include requesting session transfer of a user equipment from an internet protocol multimedia subsystem; waiting for a positive or negative acknowledgment that session transfer is possible from the internet protocol multimedia subsystem; and reporting to a mobility management entity either a generic or specific indication that the transfer is not possible when a negative acknowledgement is received. The method can also include reporting to a source mobility management entity a positive response while waiting for an actual response from the internet protocol multimedia subsystem. The reporting can include reporting a negative PS to CS response. Alternatively, the reporting can include reporting a PS to CS complete.

In certain embodiments, an apparatus includes at least one processor and at least one memory including computer program code. The at least one memory and computer program code are configured to, with the at least one processor, cause the device at least to request session transfer of a user equipment from an internet protocol multimedia subsystem. The at least one memory and computer program code are also configured to, with the at least one processor, cause the device at least to wait for a positive or negative acknowledgment that session transfer is possible from the internet protocol multimedia subsystem. The at least one memory and computer program code are further configured to, with the at least one processor, cause the device at least to report to a mobility management entity either a generic or specific indication that the transfer is not possible when a negative acknowledgement is received. The at least one memory and computer program code can also be configured to, with the at least one processor, cause the device at least to report to a source mobility management entity a positive response while waiting for an actual response from the internet protocol multimedia subsystem. The reporting can include reporting a negative PS to CS response. Alternatively, the reporting can include reporting a PS to CS complete.

An apparatus, according to certain embodiments, includes requesting means for requesting session transfer of a user equipment from an internet protocol multimedia subsystem. The apparatus also includes waiting means for waiting for a positive or negative acknowledgment that session transfer is possible from the internet protocol multimedia subsystem. The apparatus further includes reporting means for reporting to a mobility management entity either a generic or specific indication that the transfer is not possible when a negative acknowledgement is received. The reporting means can also be for reporting to a source mobility management entity a positive response while waiting for an actual response from the internet protocol multimedia subsystem. The reporting can include reporting a negative PS to CS response. Alternatively, the reporting can include reporting a PS to CS complete.

A computer readable medium (such as a non-transitory medium) can, in certain embodiments, be encoded with instructions that, when executed in hardware, perform a process. A process includes requesting session transfer of a user equipment from an internet protocol multimedia subsystem. The process also includes waiting for a positive or negative acknowledgment that session transfer is possible from the internet protocol multimedia subsystem. The process further includes reporting to a mobility management entity either a generic or specific indication that the transfer is not possible when a negative acknowledgement is received. The process can also include reporting to a source mobility management entity a positive response while waiting for an actual response from the internet protocol multimedia subsystem. The reporting can include reporting a negative PS to CS response. Alternatively, the reporting can include reporting a PS to CS complete.

According to certain embodiments, a method can include clearing a stored session transfer number for single radio voice call continuity upon receiving an indication that single radio voice call continuity is complete or unable to start due to an error. The method can also include reporting handover preparation failure with an indication of the error to a source E-UTRAN. The error can be identified generically or specifically. The method can also include setting SRVCC Operation Possible to "NO".

In certain embodiments, an apparatus includes at least one processor and at least one memory including computer program code. The at least one memory and computer program code are configured to, with the at least one processor, cause the device at least to clearing a stored session transfer number for single radio voice call continuity upon receiving an indication that single radio voice call continuity is complete or unable to start due to an error. The at least one memory and computer program code are also configured to, with the at least one processor, cause the device at least to report handover preparation failure with an indication of the error to a source E-UTRAN. The error can be identified generically or specifically. The at least one memory and computer program code can further be configured to, with the at least one processor, cause the device at least to set SRVCC Operation Possible to "NO".

An apparatus, according to certain embodiments, include clearing means for clearing a stored session transfer number for single radio voice call continuity upon receiving an indication that single radio voice call continuity is complete or unable to start due to an error. The apparatus can also include reporting means for reporting handover preparation failure with an indication of the error to a source E-UTRAN. The error can be identified generically or specifically. The apparatus can also include setting means for setting SRVCC Operation Possible to "NO".

A computer readable medium (such as a non-transitory medium) can, in certain embodiments, be encoded with instructions that, when executed in hardware, perform a process. The process can include clearing a stored session transfer number for single radio voice call continuity upon receiving an indication that single radio voice call continuity is complete or unable to start due to an error. The process can also include reporting handover preparation failure with an indication of the error to a source E-UTRAN. The error can be identified generically or specifically. The process can also include setting SRVCC Operation Possible to "NO".

We claim:

1. A method of handling a handover request comprising:
   receiving a request for the handover;
   initiating the handover;
   sending a response to the request for the handover, the response being a positive response indicating that handover is able to take place; and
   receiving a notification of failure to hand over a session, wherein the notification of failure to hand over a session is received after sending the response.

2. A method provided of requesting a handover comprising:
   sending a request for the handover to be initiated; and receiving a response to the request for the handover, the response being a positive response indicating that handover is able to take place, the response having been sent before a notification of failure to hand over a session is received.

3. A method according to claim 1 in which the request is for a session handover from one radio access technology type to another radio access technology type.

4. A method according to claim 1 in which the request is for a session handover from one radio resource type to another radio resource type.

5. A method according to claim 1 in which the handover has a first aspect in which a handover is to occur at a radio resource level and a second aspect in which a session is to be transferred.

6. A method according to claim 1 in which, following receipt of the notification of failure to hand over a session, an additional response to the request for the handover is be sent.

7. A method according to claim 6 in which the additional response is a negative response indicating that a transfer is not able to take place.

8. A method according to claim 7 in which the negative response correctly identifies a situation which was incorrectly indicated by the positive response.

9. A method according to claim 7 in which the negative response comprises a reject cause.

10. A method according to claim 7 in which the negative response is followed by at least one step taken to prevent further handover attempts.

11. A method according to claim 7 in which the negative response is followed by at least one step taken to prevent further handover attempts for a particular session.

12. A method according to claim 7 in which the negative response is followed by at least one step taken to prevent further handover attempts for other sessions.

13. A method according to claim 10 in which prevention of further handover attempts applies until remedial action is taken to resolve the issue causing the failure.

14. A method according to claim 10 in which the at least one step taken to prevent further handover attempts at least one of clearing a stored parameter and setting a session transfer operation possible value to "NO".

15. A handover handling network entity comprising:
at least one processor; and
at least one memory including computer program code,
wherein the at least one memory and the computer program code are configured to, with the at least one processor, cause the handover handling network entity at least to:
receive a request for the handover;
initiate the handover;
send a response to the request for the handover, the response being a positive response indicating that handover is able to take place; and
receive a notification of failure to hand over a session, wherein the notification of failure to hand over a session is received after the response is sent.

16. A handover requesting network entity comprising:
at least one processor; and
at least one memory including computer program code,
wherein the at least one memory and the computer program code are configured to, with the at least one processor, cause the handover requesting network entity at least to:
send a request for the handover to be initiated; and
receive a response to the request for the handover the response being a positive response indicating that handover is able to take place, the response having been sent before a notification of failure to hand over a session is received.

17. A system comprising a handover requesting network entity and a handover handling network entity, wherein the handover requesting network entity comprises:
at least one processor; and
at least one memory including computer program code,
wherein the at least one memory and the computer program code are configured to, with the at least one processor, cause the handover requesting network entity at least to:
send a request for the handover to be initiated; and
receive a response to the request for the handover, the response being a positive response indicating that handover is able to take place, the response having been sent before a notification of failure to hand over a session is received,
and the handover handling network entity comprises:
at least another processor; and
at least another memory including another computer program code,
wherein the at least another memory and the another computer program code are configured to, with the at least another processor, cause the handover handling network entity at least to:
receive a request for the handover;
initiate the handover;
send a response to the request for the handover, the response being a positive response indicating that handover is able to take place; and
receive a notification of failure to hand over a session, wherein the notification of failure to hand over a session is received after the response is sent.

18. A computer program product configured to control a processor to perform instructions to handle a handover request comprising:
receiving a request for the handover;
initiating the handover;
sending a response to the request for the handover, the response being a positive response indicating that handover is able to take place; and
receiving a notification of failure to hand over a session, wherein the notification of failure to hand over a session is received after sending the response.

19. A computer program product configured to control a processor to perform instructions to request a handover comprising:
sending a request for the handover to be initiated; and
receiving a response to the request for the handover, the response being a positive response indicating that handover is able to take place, the response having been sent before a notification of failure to hand over a session is received.

* * * * *